United States Patent
Nakagawa

(10) Patent No.: US 7,352,484 B2
(45) Date of Patent: Apr. 1, 2008

(54) PRINTING SYSTEM AND MANAGEMENT METHOD THEREFOR

(75) Inventor: Isamu Nakagawa, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 891 days.

(21) Appl. No.: 10/190,694

(22) Filed: Jul. 9, 2002

(65) Prior Publication Data

US 2003/0011818 A1 Jan. 16, 2003

(30) Foreign Application Priority Data

Jul. 16, 2001 (JP) .............................. 2001-215938

(51) Int. Cl.
*G06K 15/00* (2006.01)
(52) U.S. Cl. ...................... 358/1.15; 709/203; 707/204
(58) Field of Classification Search ............... 358/1.13, 358/1.14, 1.16, 1.15; 726/3, 26; 355/23, 355/24; 707/204, 205; 399/533, 80; 709/203
See application file for complete search history.

(56) References Cited

U.S. PATENT DOCUMENTS

| | | | |
|---|---|---|---|
| 6,078,403 A * | 6/2000 | Palmer | 358/1.18 |
| 6,307,615 B1 * | 10/2001 | Ito | 355/40 |
| 6,633,890 B1 * | 10/2003 | Laverty et al. | 707/203 |
| 6,738,152 B1 * | 5/2004 | Roth et al. | 358/1.14 |
| 6,801,929 B1 * | 10/2004 | Donoho et al. | 709/204 |
| 6,947,174 B1 * | 9/2005 | Chen et al. | 358/1.9 |
| 7,180,608 B1 * | 2/2007 | Yu | 358/1.1 |
| 7,191,438 B2 * | 3/2007 | Bryant | 717/176 |
| 2002/0191213 A1 * | 12/2002 | Leverty et al. | 358/1.15 |
| 2003/0011801 A1 * | 1/2003 | Simpson et al. | 358/1.13 |
| 2003/0140315 A1 * | 7/2003 | Blumberg et al. | 715/527 |
| 2005/0200895 A1 * | 9/2005 | Isoda et al. | 358/1.16 |
| 2005/0273863 A1 * | 12/2005 | Nakao et al. | 726/26 |
| 2006/0053481 A1 * | 3/2006 | Olsen et al. | 726/3 |

\* cited by examiner

*Primary Examiner*—Jerome Grant, II
(74) *Attorney, Agent, or Firm*—Fitzpatrick Cella Harper & Scinto

(57) ABSTRACT

A computer transmits a command to change the operation of a print command to a printing apparatus. The printing apparatus changes the operation of the print command and records information (print record) associated with printing on a storage unit in accordance with the changed print command. The reading unit of the computer reads the print record recorded by the printing apparatus, and the management unit of the computer manages the read print record.

22 Claims, 11 Drawing Sheets

FIG. 8

| PRINT COMMAND | CONTENTS |
|---|---|
| Startjob | INITIALIZATION<br><br>RECORD EXECUTOR, START TIME, AND THE LIKE |
| Endpage | RECORD INFORMATION ASSOCIATED WITH PAGE |
| Endjob | RECORD END TIME AND THE LIKE<br><br>RECORD ON NONVOLATILE MEMORY<br><br>TERMINATION |

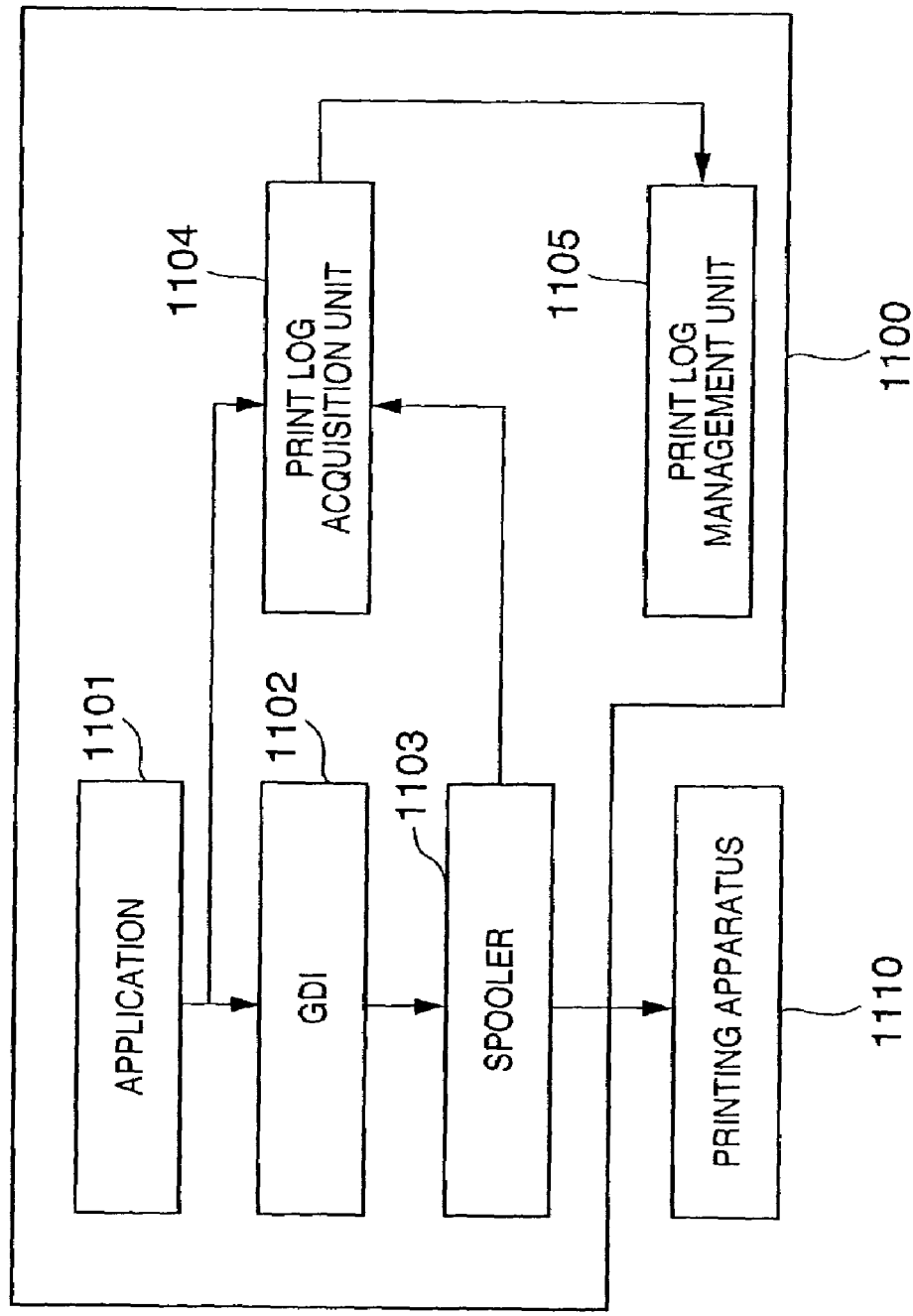

PRINTING SYSTEM AND MANAGEMENT METHOD THEREFOR

FIELD OF THE INVENTION

The present invention relates to a printing system constituted by a printing apparatus and computer which are connected to each other through a network, and a management method program, and storage medium therefore.

BACKGROUND OF THE INVENTION

Conventionally, in order to manage a job account system for checking and analyzing a use record for each user and a use log and print log for the prevention of printing of a confidential document, it is necessary to acquire information about jobs executed by a printing apparatus or it peripheral device. As a method of acquiring such job information, the following method is available.

FIG. 11 is a block diagram for explaining a method of managing a print log in a conventional printing system. As shown in FIG. 11, in the printing system constituted by a host computer 1100 and printing apparatus 1110, when the user designates to print, for example, a document from an application 1101 in the host computer 1100, the application 1101 issues a print command to a graphic device interface (GDI) 1102 by using an application programming interface (API) provided by an operating system (OS).

The GDI 1102 converts the print command issued from the application 1101 into a form suitable for target printing equipment (the printing apparatus 1110 in this case), and transmits it to a spooler 1103. Note that a set of print commands will be referred to as a "job". A print command is described by, for example, a page description language (PDL).

In this case, the spooler 1103 transmits the job from the GDI 1102 to the printing apparatus 1110. With this operation, the printing apparatus 110 properly interprets the job and executes printing.

A print log acquisition unit 1104 then acquires the print log by a GDI hook method or job attribute acquisition method (to be described later).

According to the GDI hook method, the application 1101 hooks the print command issued to the GDI 1102, and counts, for example, the number of paper discharge commands to know the number of printing sheets required for the job. In addition, information about paper size, layout, one-sided/double-sided printing, gathering, and the like can be acquired by hooking proper commands.

The job attribute acquisition method uses the API of an OS. Some OSs provide an API for acquiring information about printing, e.g., the number of pages to be printed and the number of sheets, which is held in the spooler 1103. A print log management unit 1105 monitors the spooler 1103, issues a proper API when a job is input, and acquires information about printing, thereby forming a print log.

The conventional methods, however, have the following drawbacks because information is acquired in the host computer 1100 which inputs a job.

(1) The print log acquisition unit 1104 must be installed in the host computer 1100. That is, an operation environment must be set. This requires much labor.

(2) The print log acquired by the GDI hook method or job attribute acquisition method may differ from the actual print result. For example, a hard return or forced paper discharge may occur on the printing apparatus 1110 side at an unexpected time, resulting in a change in the number of pages, some pages may not be discharged because of jam, or no job may be executed because of power disconnection.

SUMMARY OF THE INVENTION

The present invention has been made to solve the above problems, and has as its object to provide a printing system which can easily and accurately acquire information about a job executed by a printing apparatus or its peripheral device, and a management method, program, and storage medium therefore.

In order to achieve the above object, according to an aspect of the present invention, there is provided a printing system constituted by a printing apparatus and a computer which are connected to each other through a network, comprising: in the printing apparatus changing means for changing operation of a print command sent from the computer; and recording means for recording information associated with printing in accordance with the changed print command, and in the computer transmitting means for transmitting a command to change operation of a print command to the printing apparatus; reading means for reading information associated with printing which is recorded by the printing apparatus; and management means for managing the read information associated with printing.

According to another aspect of the present invention, there is provided a management method for a printing system constituted by a printing apparatus and a computer which are connected to each other through a network, comprising the steps of: in the printing apparatus changing operation of a print command sent from the computer; and recording information associated with printing in accordance with the changed print command, and in the computer transmitting a command to change operation of a print command to the printing apparatus; reading information associated with printing which is recorded by the printing apparatus; and managing the read information associated with printing.

According to still another aspect of the present invention, there is provided a program for a printing system constituted by a printing apparatus and a computer which are connected to each other through a network, which causes the printing apparatus to function as changing means for changing operation of a print command sent from the computer; and recording means for recording information associated with printing in accordance with the changed print command, and causes the computer to function as transmitting means for transmitting a command to change operation of a print command to the printing apparatus; reading means for reading information associated with printing which is recorded by the printing apparatus; and management means for managing the read information associated with printing.

According to still another aspect of the present invention, there is provided a computer-readable recording medium on which a program is recorded, which causes the printing apparatus to function as changing means for changing operation of a print command sent from the computer; and recording means for recording information associated with printing in accordance with the changed print command, and causes the computer to function as transmitting means for transmitting a command to change operation of a print command to the printing apparatus; reading means for reading information associated with printing which is recorded by the printing apparatus; and management means for managing the read information associated with printing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a view showing print commands re-defined by a print record program;

FIG. 11 is a block diagram for explaining a print log management method in a conventional printing system.

DETAILED DESCRIPTION OF THE PREFERRED EMBODIMENT

An embodiment of the present invention will be described below with reference to the accompanying drawings.

Figure 1:
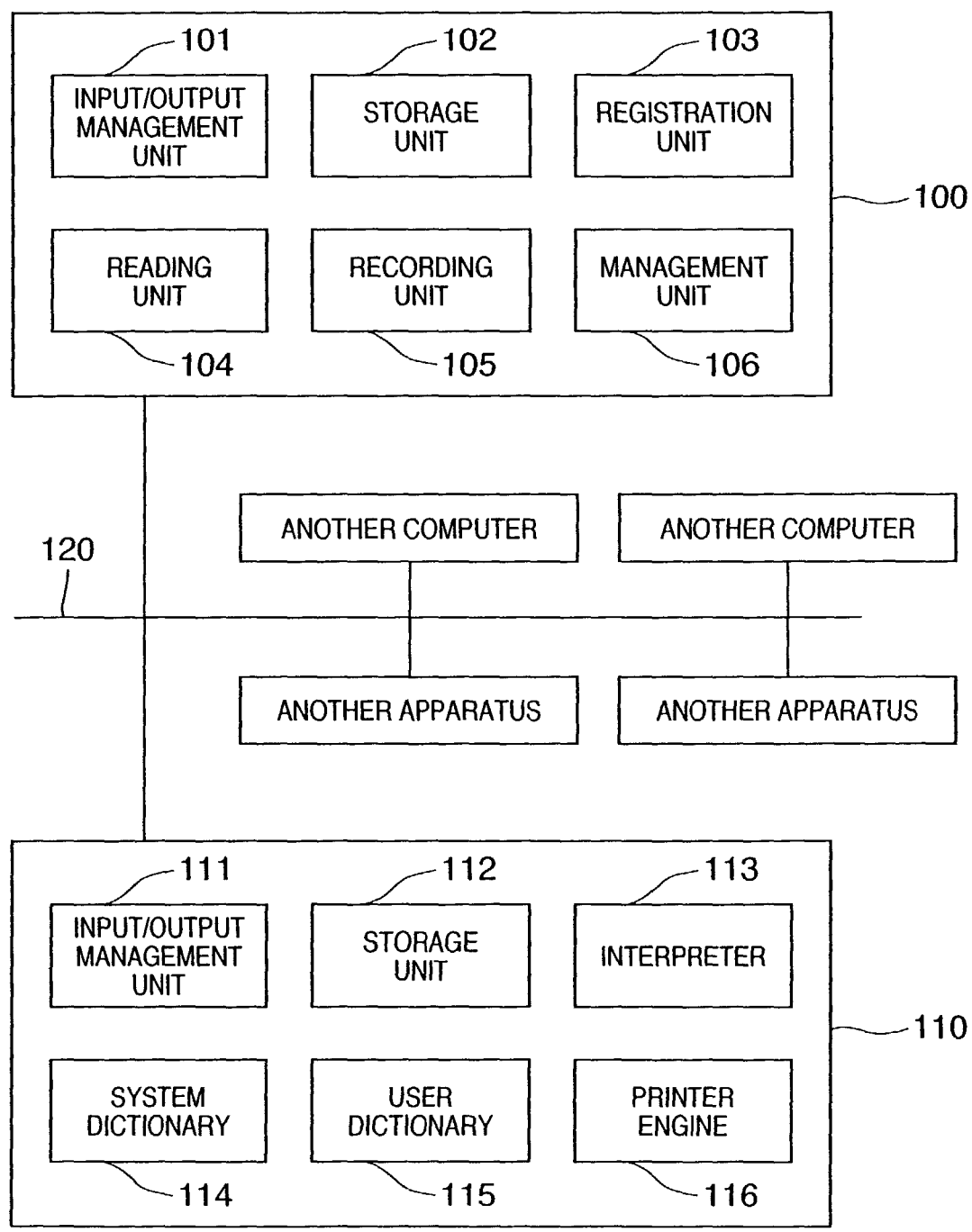
FIG. 1 is a block diagram showing the basic arrangement of a printing system according to an embodiment.

FIG. 1 is a block diagram showing the basic arrangement of a printing system according to this embodiment. Referring to FIG. 1, reference numeral 100 denotes a host computer which performs processing, e.g., communicating with printing equipment such as a printing apparatus, a copying machine, a facsimile apparatus, or a multi-functional printer (MFP) having a combination of these functions to acquire a print record from the printing equipment, transmitting a print record upon reception of a request from another computer, and deleting an unnecessary print record.

Reference numeral 110 denotes a printing apparatus 110, e.g., a laser beam printer based on an electrophotographic scheme or ink-jet printer based on an ink discharging scheme; and 120, a network to which many computers, printing apparatuses, peripheral devices, and the like, other than the host computer 100 and printing apparatus 110, are connected.

Functional blocks in the host computer 100 and printing apparatus 110 will be described next. The hardware arrangement will be further described later with reference to FIGS. 2 and 3.

In the host computer 100, reference numeral 101 denotes an input/output management unit for performing control when the host computer 100 transmits/receives data through the network 120; 102, a storage unit in which various data are stored; 103, a registration unit which registers a print record program and data in the printing apparatus 110 in this embodiment; 104, a reading unit which reads a print record from the printing apparatus 110; 105, a recording unit which stores the print record read by the reading unit 104, as a print log, in the storage unit 102; and 106, a management unit which performs management, e.g., reading out a print log as needed or deleting an unnecessary portion.

In the printing apparatus 110, reference numeral 111 denotes an input/output management unit which performs control when the printing apparatus 110 transmits/receives data through the network 120; 112, a storage unit 112 in which various data are stored; 113, an interpreter which interprets the print command received from the host computer 100 through the input/output management unit 111, and converts the command into data in a form that can be interpreted by the printer engine; 114, a system dictionary in which the default of a print command interpreted by the interpreter 113 is defined; and 115, a user dictionary defined by the user.

In this embodiment, a print command can be re-defined from another apparatus connected to the network 120. The re-defined print command is stored in the user dictionary 115. Reference numeral 116 denotes a printer engine which performs processing, e.g., printing on a medium such as a printing paper sheet, and discharging the medium.

The internal arrangements of the host computer 100 and printing apparatus 110 in FIG. 1 will be described next.

Figure 2:
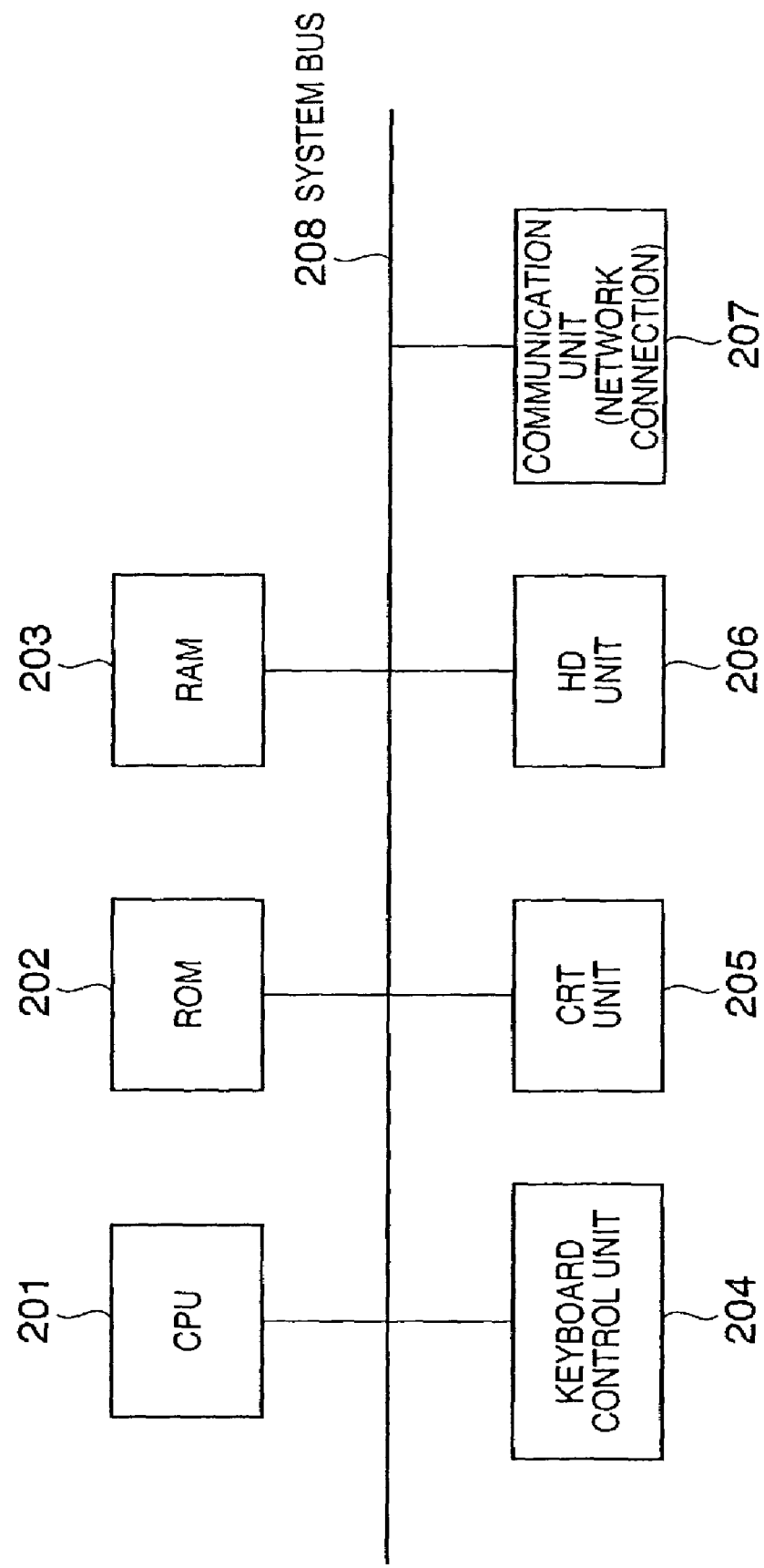
FIG. 2 is a block diagram showing the internal arrangement of a host computer 100.

FIG. 2 is a block diagram showing the internal arrangement of the host computer 100. Referring to FIG. 2, reference numeral 201 denotes a CPU, i.e., a central processing unit, which performs overall control on the computer, arithmetic processing, and the like; 202, a ROM which is a read-only memory which has a storage area in which information about a system start program and the like are stored; and 203, a RAM, i.e., a random access memory, which is a data storage area on which no application limitation is imposed and in which programs, e.g., an application, device driver, and communication control, are loaded and executed.

Reference numeral 204 denotes a keyboard control unit (KBC) which receives input data from a keyboard, mouse, or the like (not shown) and transfers it to the CPU 201; 205, a CRT unit, i.e., a display control unit, which performs display control on a display apparatus (not shown); and 206, an HD unit, i.e., an external storage unit such as a floppy disk unit (FD), hard disk unit (HD), or a nonvolatile storage unit (SRAM) in which programs and data are recorded/stored. Such programs and data are loaded into a reference area or RAM 203 as needed when the CPU 201 executes them. Reference numeral 207 denotes a communication unit which performs network communication control and can communicate with another computer or peripheral device connected to the network 120, as described with reference to FIG. 1; and 208, a system bus which is to serve as a data path between the above constituent elements.

Figure 3:
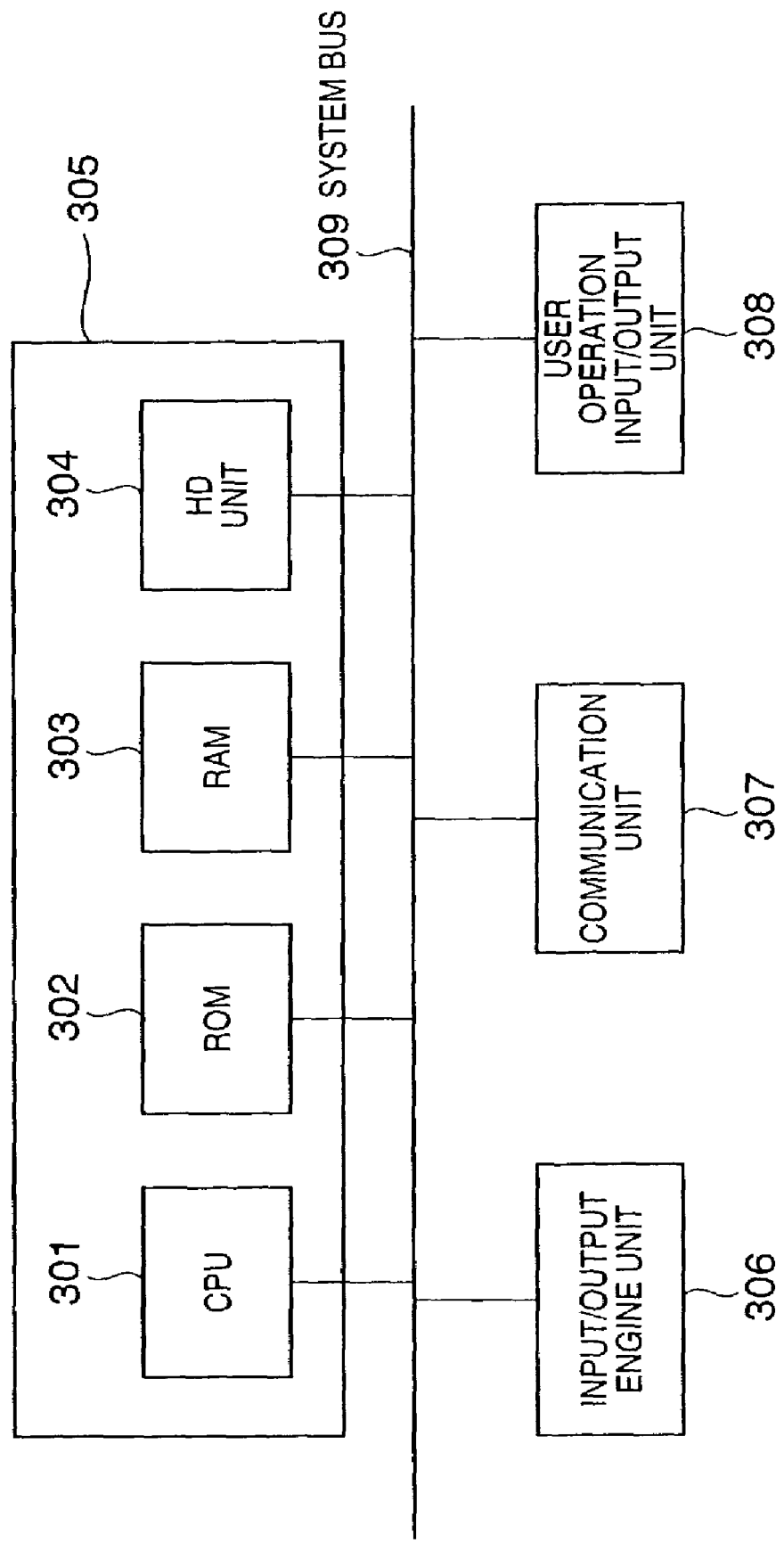
FIG. 3 is a block diagram showing the internal arrangement of a printing apparatus 110.

FIG. 3 is a block diagram showing the internal arrangement of the printing apparatus 110. Referring to FIG. 3, reference numeral 305 denotes a controller unit which controls the overall peripheral equipment. In the internal arrangement of the controller unit 305, reference numeral 301 denotes a CPU, i.e., a central processing unit, which controls the controller unit 305 and performs arithmetic processing and the like; 302, a ROM, i.e., a read-only memory, which is a storage area in which information of a system start program and the like are stored; 303, a RAM, i.e., random access memory, which is a data storage area on which no application limitation is imposed and in which an operating system (OS) and programs for communication control and engine control and the like are loaded and executed; and 304, an HD unit, i.e., a hard disk or nonvolatile storage device (SRAM).

Reference numeral 306 denotes an input/output engine unit which prints and reads an image under the control of the controller unit 305; 307, a communication unit which performs network communication control; 308, a user operation input/output unit which receives an input from the user and outputs information to the user. Note that as an output means, a panel having the function of displaying character strings or a display which displays an arbitrary image may be used. Reference numeral 309 denotes a system bus which servers as a data path between the above constituent elements.

A memory map set in the RAM 203 when the CPU 201 of the host computer 100 performs processing in accordance with an application program loaded by the operating system will be described next.

Figure 4:
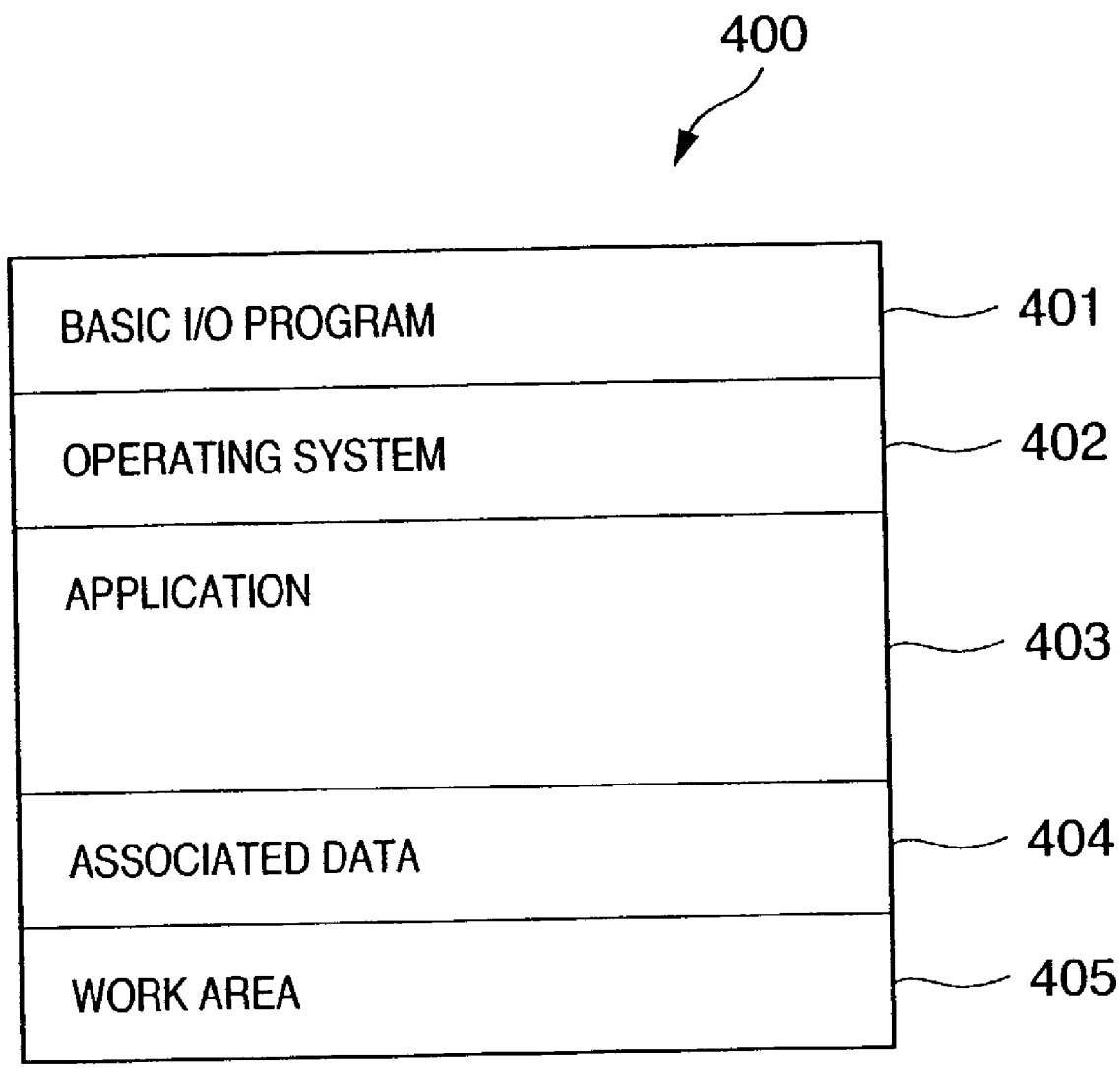
FIG. 4 is a view showing a memory map (program module) in the host computer 100.

FIG. 4 is a view showing a memory map (program module) in the host computer 100. Referring to FIG. 4, reference numeral 401 denotes a basic I/O program for transmitting/receiving data to/from each input/output device connected to the host computer 100; 402, an operating system which is loaded in the RAM 203 when power is turned on; 403, an application program which is loaded into the RAM 203 to be executed; 404, associated data which is associated with the application program and loaded in the RAM 203 to be executed; and 405, a work memory used by each program.

A print log management program, which is loaded as an application program to manage a use log and print log of the printing apparatus 110, and associated data will be described next.

Assume that in this embodiment, the print log management program (module) and associated data are recorded on a floppy disk (FD). Obviously, however, they may be recorded on a different medium.

Figure 5:
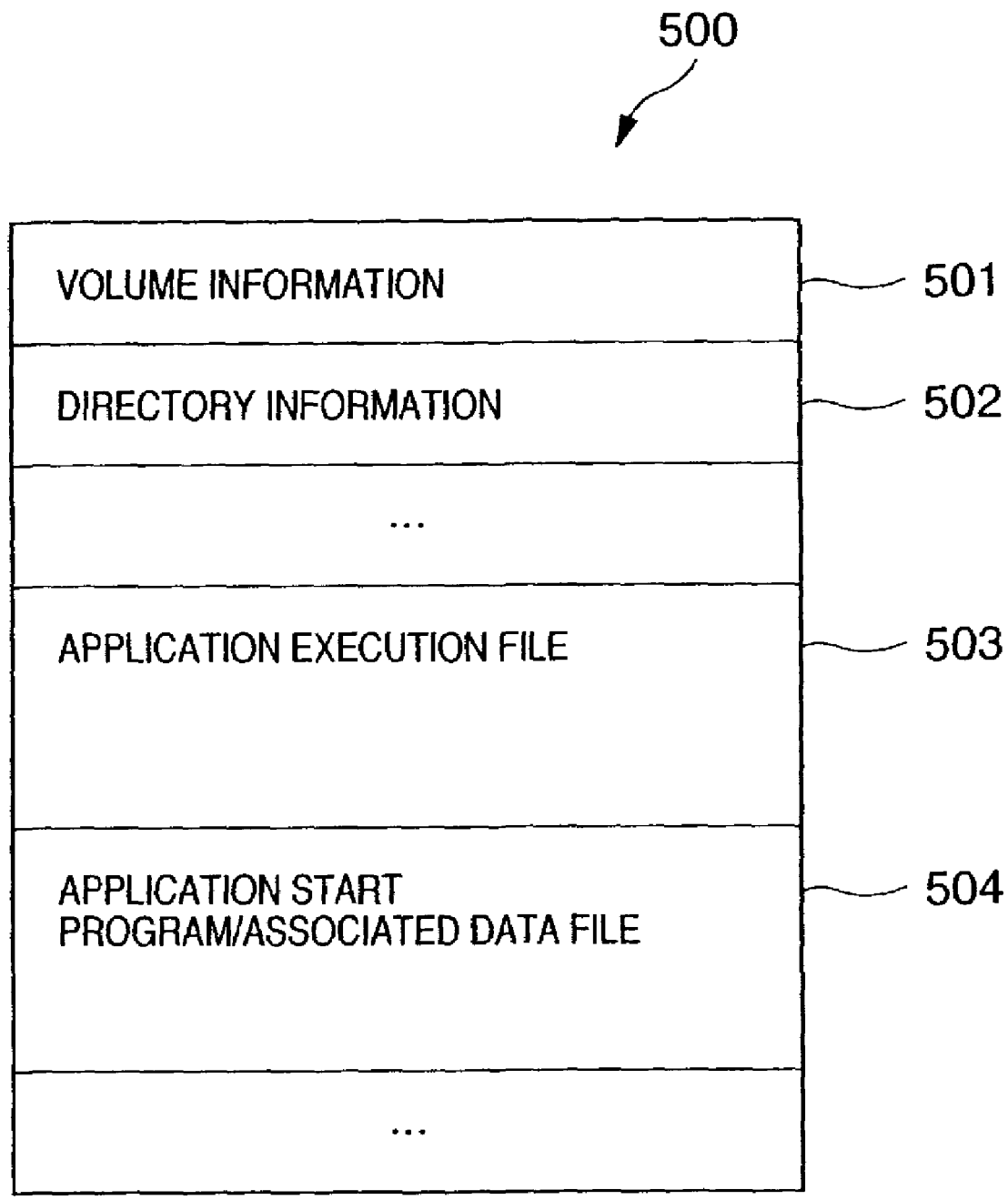
FIG. 5 is a view showing the contents recorded on a floppy disk (FD)

FIG. 5 is a view showing the contents stored in a floppy disk (FD). As shown in FIG. 5, volume information 501, directory information 502, an application execution file 503, an application start program, an associated data file 504, and the like are recorded in a recording area 500 of the floppy disk (FD).

Figure 6:
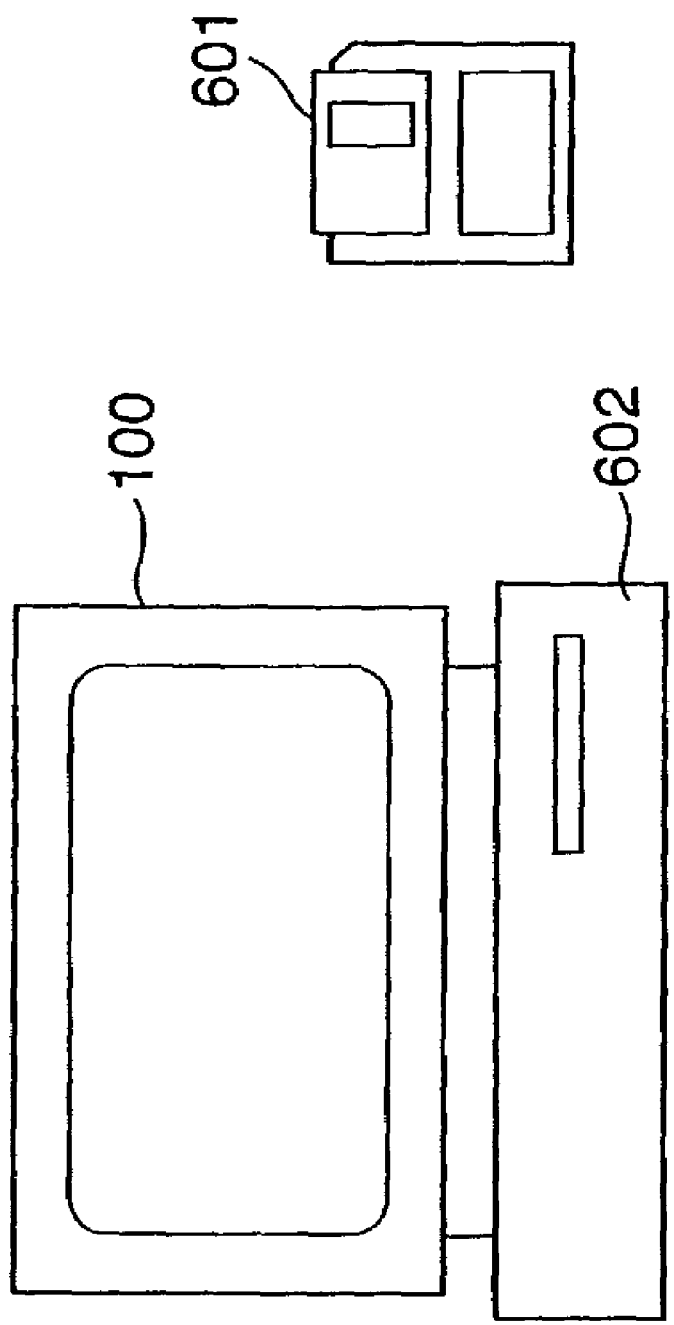
FIG. 6 is a view for explaining how a print log management program and associated data are loaded into the computer.

As shown in FIG. 6, the print log management program and associated data recorded on a floppy disk (FD) 601 can be loaded into the host computer 100 through an FD drive DKC 602 set in the host computer 100. More specifically, when the user sets this floppy disk (FD) 601 in the FD driver DKC 602, the print log management program and associated data are read out from the floppy disk (FD) 601 and loaded into the RAM 203 to be used under the control of the operating system 402 and basic I/O program 401 shown in FIG. 4.

The operation of the print log management program to be loaded into the RAM 203 of the host computer 100 and executed by the CPU 201 will be described next.

Figure 7:
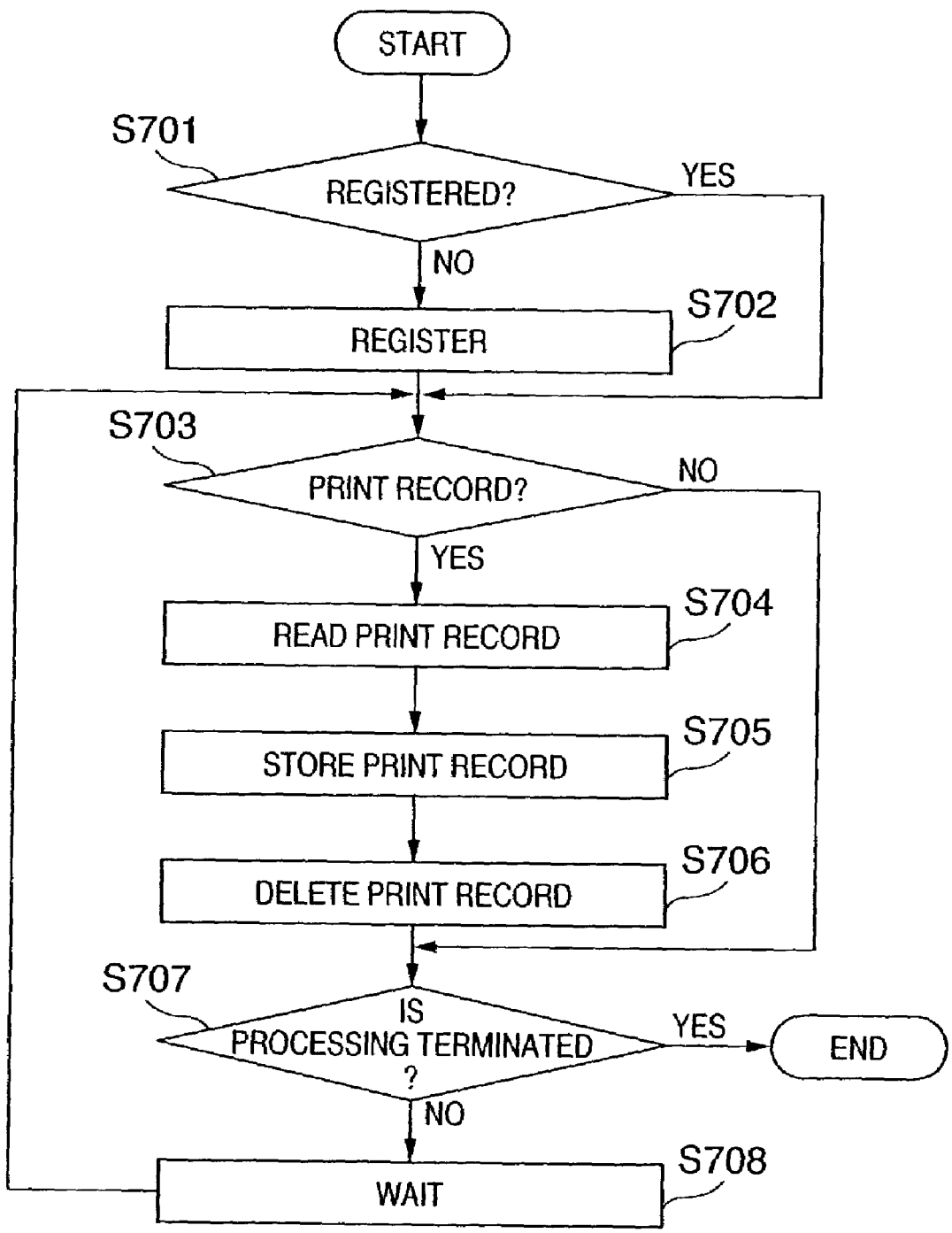
FIG. 7 is a flow chart showing the processing done by the print log management program.

FIG. 7 is a flow chart showing the processing done by the print log management program. First of all, in step S701, the registration unit 103 checks whether the registration unit 103 has already registered a print record program in the printing apparatus 110. If YES in step S701, the flow advances to step S703. If NO in step S701, the flow advances to step S702 to transmit the print record program to the printing apparatus 110 and make the printing apparatus 110 change a print control so as to store a print log for each job.

In this case, the printing apparatus 110 re-defines a print command on the basis of the print record program transmitted from the host computer 100, and stores the command in the user dictionary 115. With this operation, the printing apparatus 110 can store a print log in the storage unit 112 for each job.

FIG. 8 is a view showing print commands that are re-defined by the print record program. FIG. 8 shows print commands and their contents in the form of a table. This table shows differences from the original definitions of the respective print commands.

"StartJob" in FIG. 8 is a command that is issued to start a job. This command is executed to perform various initialization processing, e.g., ensuring a memory to record a job log. In addition, an executor, start time, computer name, and the like which are items of a job log are recorded on the memory. Thereafter, the StartJob command which is defined by the default is executed. "EndPage" is a command for a page break. This command serves to record the color information, paper size, and paper type of a page subjected to a page break on the memory. Thereafter, the EndPage command defined by the default is executed. "EndJob" is a command to be issued to terminate a job. This command serves to record an end time and the like on the memory. At this time, since information about each item constituting a jog log is determined, the information of each item recorded on the memory is recorded on a nonvolatile storage device such as a hard disk. Thereafter, the EndJob command defined by the default is executed.

In the case shown in FIG. 8, the operations of a command that is issued to start a job in a page description language, a command for a page break, and a command for terminating the job are re-defined. The present invention, however, can be implemented by re-defining only the command for a page break. If, for example, PostScript which is open to the public by Adobe Systems Inc. in the USA is used as a page description language, the present invention can be implemented by re-defining EndPage which is a procedure. This is because, since the start or end of a job can be discriminated from a parameter transferred from an interpreter according to the EndPage procedure, the task that should be done by StartJob or EndJob in FIG. 8 can also be done by re-defined EndPage.

Referring back to FIG. 7, in step S703, the reading unit 104 sends an inquiry command to the printing apparatus 110 to check whether a print record is stored or not. If YES in step S703, the flow advances to step S704, in which the reading unit 104 reads out the print record from the printing apparatus 110.

Figure 9:
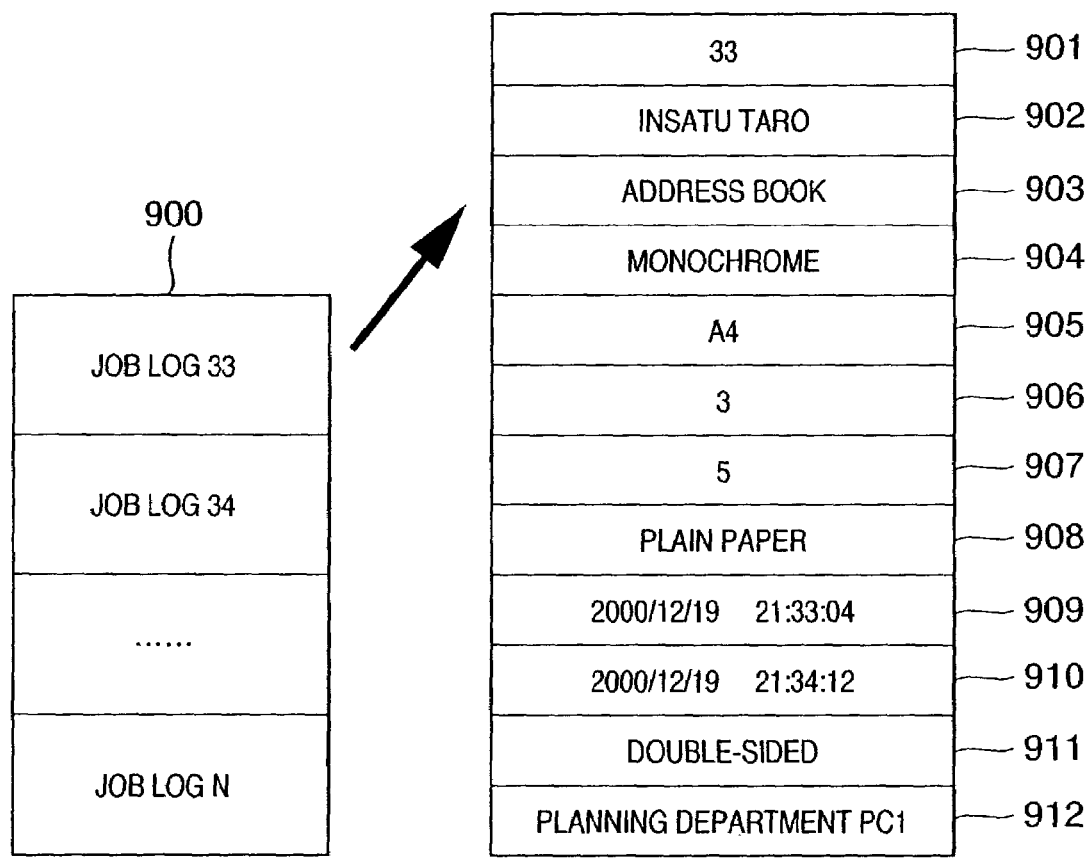
FIG. 9 is a view showing an example of a print record stored in the printing apparatus 110.

FIG. 9 is a view showing an example of the print record stored in the printing apparatus 110. Referring to FIG. 9, reference numeral 900 denotes a print record, in which the contents of each job (job log) are recorded. In this case, job logs indicated by number 33 to number N are recorded.

Reference numerals 901 to 912 in FIG. 9 indicate the detailed specific example of job log 33. "33" 901 indicates a number assigned to each job. "Insatu Taro" 902 indicates the executor of the job. "Address book" 903 indicates a job name. "Monochrome" 904 is the color information of the job and indicates that monochrome printing is done. "A4" 905 indicates a paper size. "3" 906 indicates the number of sheets discharged. "5" 907 indicates the number of sheet surfaces on which printing is done. "Plain paper" 908 indicates a paper type. "2000/12/19 21:33.04" 909 indicates the start time. "2000/12/19 21:34.12" 910 indicates the end time. "Double-sided" 911 indicates whether one-side or double-sided printing is done. "Planning Department PC1" 912 is a character string that identifies the host computer 100 or another apparatus which has generated the print command. In this case, this indicates a computer name.

Referring back to FIG. 7, in step S705, the recording unit 105 stores the print record read in step S704 in the storage unit 102. The storage unit 102 may be a memory or a nonvolatile storage device such as a hard disk or flash memory.

In step S706, since the print record stored in the printing apparatus 110 is completely read and stored, the print record is deleted. In step S707, it is determined whether the processing is terminated. Although not described in detail, this determination may be done on the basis of an end command from the user or an end request from the OS.

If NO in step S707, the flow advances to step S708 to interrupt the processing for a predetermined period of time. After the predetermined period of time, the flow returns to step S703 to repeat the above processing done by the print record management program.

The printing apparatus 110 analyzes the print data (page description language command) sent from the host computer 100, stores the print log of each job in the storage unit 112, and performs printing. This operation will be described next.

Figure 10:
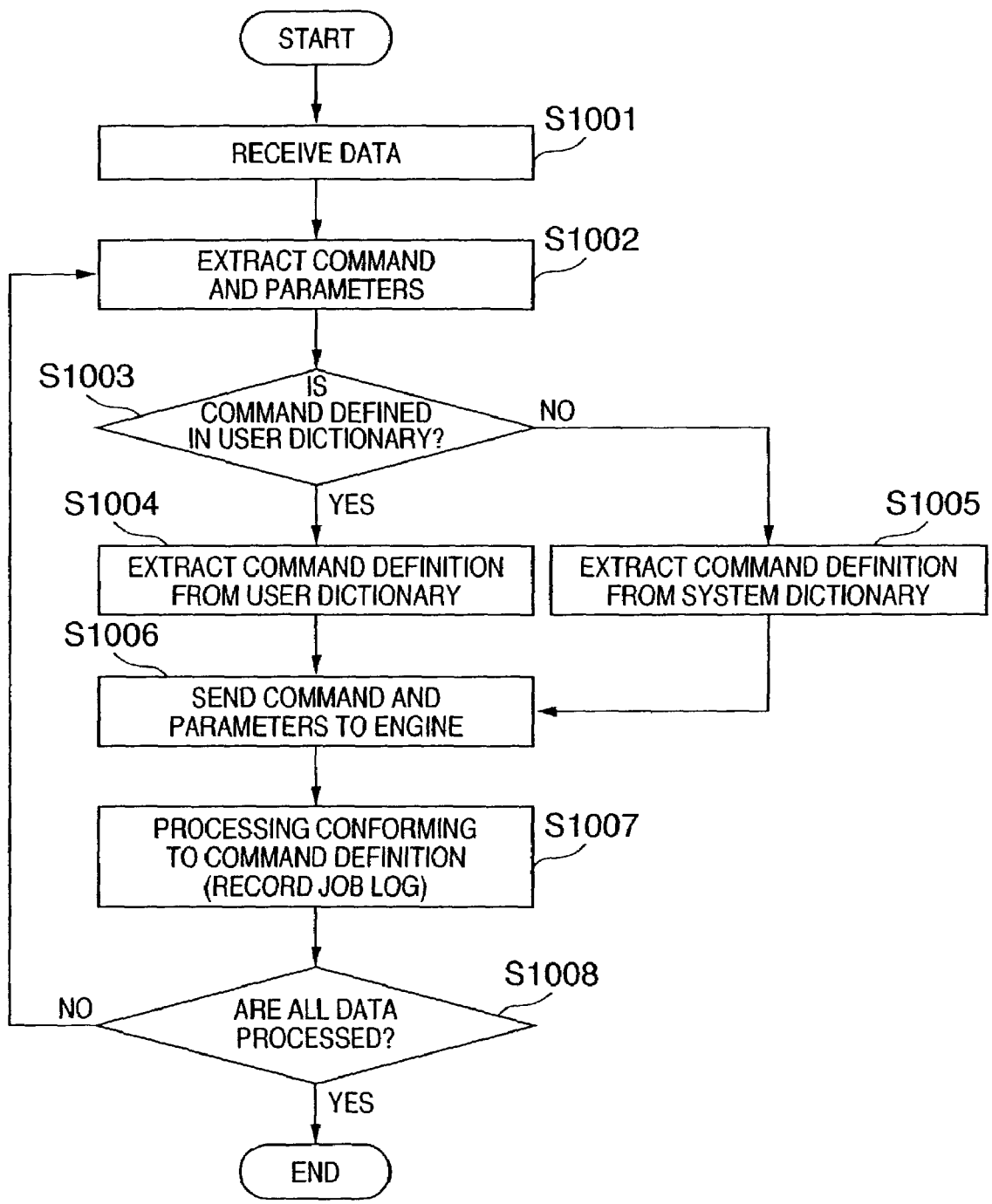
FIG. 10 is a flow chart showing the command processing done by the printing apparatus 110.

FIG. 10 is a flow chart showing the command processing done by the printing apparatus 110. First of all, in step S1001, the interpreter 113 receives a data stream forming a job from the input/output management unit 111. The data stream is written by a page description language. In step S1002, a set of a command and its parameters are extracted from the data stream. In step S1003, it is checked whether the command is defined in the user dictionary 115. If NO in step S1003, the flow advances to step S1004. If YES in step S1003, the flow advances to step S1005.

In step S1004, a command definition is extracted from the user dictionary 115. Note that the command definition is a command in the page description language which is converted into a form that can be interpreted by the printer engine 116. In step S1005, a command definition is extracted from the system dictionary system 114.

In step S1006, the command definition and parameters are sent to the printer engine 116. In step S1007, the printer engine 116 executes processing conforming to the command definition. In this case, as shown in FIG. 8, when a print command which has been changed to record a job log and re-defined in the user dictionary 115 is executed, a print record like the one shown in FIG. 9 is stored in the storage unit 112. In step S1008, it is checked whether all the data streams are processed. If NO in step S1008, the flow returns to step S1002 to repeat the above command processing. When processing of all the data streams is completed thereafter, the command processing is terminated.

As has been described above, the computer connected to the network changes the operation of a command in the printing apparatus, and the command whose operation is changed is used to print a job log in the printing apparatus. The computer then acquires the job log. This makes it possible to acquire an accurate print log without making any additional settings in the computer that transmits a print job.

In the above embodiment, the program that operates in the printing apparatus records a print record on a nonvolatile storage device. However, this print record may be recorded on the memory.

In addition, in the above embodiment, one computer reads out a print record from the printing apparatus and manages the print record. However, the read print record may be transferred to another computer to make it manage the print record.

Furthermore, one computer may read out print records from a plurality of printing apparatuses and manage the print records.

That is, the present invention is effectively applied to a plurality of computers that read out a print record from a printing apparatus, a plurality of printing apparatuses that record print records, and a system constituted by a plurality of computers that manage print records.

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiment to a system or apparatus, and causing the computer (or a CPU or an MPU) of the system or apparatus to read out and execute the program codes stored in the storage medium.

In this case, the program codes read out from the storage medium realize the functions of the above-described embodiment by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiment are realized not only when the readout program codes are executed by the computer but also when the OS (Operating System) running on the computer performs part or all of actual processing on the basis of the commands of the program codes.

The functions of the above-described embodiment are also realized when the program codes read out from the storage medium are written in the memory of a function expansion board inserted into the computer or a function expansion unit connected to the computer, and the CPU of the function expansion board or function expansion unit performs part or all of actual processing on the basis of the commands of the program codes.

As has been described above, according to this embodiment, a reduction in labor in system setting and an increase in the precision of a print log can be attained.

As many apparently widely different embodiments of the present invention can be made without departing from the spirit and scope thereof, it is to be understood that the invention is not limited to the specific embodiments thereof except as defined in the appended claims.

What is claimed is:

1. A printing system constituted by a printing apparatus and a host computer which are connected to each other through a network, the printing apparatus having a system dictionary in which a default of print commands has been defined, wherein the host computer comprises:

a first determination unit configured to determine whether or not a print record program is registered in the printing apparatus, the print record program being registered for causing the printing apparatus to redefine a print command defined in the system dictionary as a specific print command in a user dictionary such that a print record of each print data is stored;

a first transmission unit configured to transmit the print record program to the printing apparatus in a case where it is determined by the first determination unit that the print record program is not registered in the printing apparatus; and a second transmission unit configured to transmit print data to the printing apparatus, wherein the printing apparatus comprises:

a first reception unit configured to receive the print record program from the host computer to redefine a print command defined in the system dictionary as a specific print command in a user dictionary based on the print record program;
a second reception unit configured to receive the print data from the host computer;
an extraction unit configured to extract a print command from the print data received by the second reception unit;
a second determination unit configured to determine whether or not the print command extracted by said extraction unit has been redefined as the specific print command in the user dictionary; and
an execution unit configured to execute the specific print command redefined in the user dictionary in a case where it is determined by the second determination unit that the print command has been redefined, and to execute the print command in a case where it is determined by the second determination unit that the print command is not redefined.

2. The system according to claim 1, wherein the specific print command is at least one of print commands for defining a job start, a page break, and a job end.

3. The system according to claim 1, wherein the print record includes at least an executor of a job, start and end times, a paper size, a print layout, and a computer name.

4. A printing apparatus comprising:
a first reception unit configured to receive a print command from a host computer;
a determination unit configured to determine whether or not the print command received by said first reception unit has been redefined as a specific print command in a user dictionary for storing a print record associated with printing; and
an execution unit configured to execute the specific print command redefined in the user dictionary in a case where it is determined by the determination unit that the print command has been redefined, and to execute the print command in a case where it is determined by the determination unit that the print command is not redefined,
wherein at lease one of print commands for defining a job start, a page break and a job end has been redefined as the specific print command in the user dictionary, and
wherein said execution unit executes a page break process originally defined with recording color information, paper size and paper type of a page subjected to a page break in the print record, in case of the page break.

5. The apparatus according to claim 4, wherein the print record includes at least an executor of a job, start and end times, a paper size, a print layout, and a computer name.

6. The apparatus according to claim 4, further comprising a second reception unit configured to receive a print record program from the host computer to redefine the print command as the specific print command for storing the print record associated with printing, based on the print record program.

7. The apparatus according to claim 4, wherein said execution unit executes a job start process defined by the default with recording a executer, start time and computer name in the print record, in case of the job start.

8. The apparatus according to claim 4, wherein said execution unit executes a job end process defined by the default with recording an end time in the print record, in case of the job end.

9. A control method for a printing apparatus comprising:
a step of receiving a print command from a host computer;
a step of determining whether or not the print command received in said receiving step has been redefined as a specific print command in a user dictionary for storing a print record associated with printing; and
an executing step of executing the specific print command redefined in the user dictionary in a case where it is determined in said determining step that the print command has been redefined, and executing the print command in a case where it is determined in said determining step that the print command is not redefined,
wherein at least one of print commands for defining a job start, a page break and a job end has been redefined as the specific print command in the user dictionary, and
wherein said executing step executes a page break process originally defined with recording color information, paper size and paper type of a page subjected to a page break in the print record, in case of the page break.

10. The method according to claim 9, wherein the specific print command is at least one of print commands for defining a job start, a page break, and a job end.

11. The method according to claim 9, wherein the recording process records information generated when printing for each job sent from the computer.

12. The method according to claim 9, wherein the print record includes at least an executor of a job, start and end times, a paper size, a print layout, and a computer name.

13. The method according to claim 9, wherein the recording process records a job log as the information.

14. A computer-readable recording medium storing a program for causing a computer to execute a control method for a printing apparatus as set forth in claim 9.

15. A printing apparatus comprising:
a first reception unit configured to receive a print command from a host computer;
a second reception unit configured to receive a print record program from the host computer to redefine the print command as the specific print command in a user dictionary for storing the print record associated with printing, based on the print record program;
a determination unit configured to determine whether or not the print command received by said first reception unit has been redefined as a specific print command; and
an execution unit configured to execute the specific print command redefined in the user dictionary in a case where it is determined by the determination unit that the print command has been redefined, and to execute the print command in a case where it is determined by the determination unit that the print command is not redefined.

16. The apparatus according to claim 15, wherein the print record includes at least an executor of a job, start and end times, a paper size, a print layout, and a computer name.

17. The apparatus according to claim 15, wherein at least one of print commands for defining a job start, a page break and a job end has been redefined as the specific print command in the user dictionary.

18. The apparatus according to claim 17, wherein said execution unit executes a job start process defined by the default with recording a executer, start time and computer name in the print record, in case of the job start.

19. The apparatus according to claim 17, wherein said execution unit executes a page break process defined by the default with recording color information, paper size and paper type of a page subjected to a page break in the print record, in case of the page break.

20. The apparatus according to claim 17, wherein said execution unit executes a job end process defined by the default with recording an end time in the print record, in case of the job end.

21. A control method for a printing apparatus comprising:
- a first receiving step of receiving a print command from a host computer;
- a second receiving step of receiving a print record program from the host computer to redefine the print command as the specific print command in a user dictionary for storing the print record associated with printing, based on the print record program;
- a step of determining whether or not the print command received in said first receiving step has been redefined as a specific print command; and
- a step of executing the specific print command redefined in the user dictionary in a case where it is determined in said determining step that the print command has been redefined, and to execute the print command in a case where it is determined in said determining step that the print command is not redefined.

22. A computer-readable memory medium for instructing a computer to perform a control method for a printing apparatus comprising:
- a first receiving step of receiving a print command from a host computer;
- a second receiving step of receiving a print record program from the host computer to redefine the print command as the specific print command in a user dictionary for storing the print record associated with printing, based on the print record program;
- a step of determining whether or not the print command received in said first receiving step has been redefined as a specific print command; and
- a step of executing the specific print command redefined in the user dictionary in a case where it is determined in said determining step that the print command has been redefined, and to execute the print command in a case where it is determined in said determining step that the print command is not redefined.

* * * * *

UNITED STATES PATENT AND TRADEMARK OFFICE
CERTIFICATE OF CORRECTION

PATENT NO. : 7,352,484 B2
APPLICATION NO. : 10/190694
DATED : April 1, 2008
INVENTOR(S) : Isamu Nakagawa Page 1 of 1

It is certified that error appears in the above-identified patent and that said Letters Patent is hereby corrected as shown below:

COLUMN 1:
Line 16, "it" should be deleted.

COLUMN 2:
Line 9, "its" should be deleted.

COLUMN 5:
Line 8, "servers" should read --serves--.

COLUMN 9:
Line 42, "lease" should read --least--.
Line 60, "a executer," should read --an executor,--.

COLUMN 10:
Line 61, "a executer," should read --an executor,--.

Signed and Sealed this

Seventh Day of April, 2009

JOHN DOLL
*Acting Director of the United States Patent and Trademark Office*